Patented Oct. 23, 1923.

1,471,854

UNITED STATES PATENT OFFICE.

WALTER A. MANSS, OF WILMINGTON, DELAWARE, ASSIGNOR TO E. I. DU PONT DE NEMOURS & COMPANY, OF WILMINGTON, DELAWARE, A CORPORATION OF DELAWARE.

BLUE SULPHUR DYE.

No Drawing. Application filed December 22, 1922. Serial No. 608,575.

*To all whom it may concern:*

Be it known that I, WALTER A. MANSS, a citizen of the United States, and a resident of Wilmington, in the county of New Castle and State of Delaware, have invented certain new and useful Blue Sulphur Dyes, of which the following is a specification.

This invention relates to the production of exceptionally pure sulphur derivatives of aryl-para-amino-para-oxy-diarylamines or of the corresponding indophenols.

To those skilled in the art it is well known that very beautiful indigo shades can be produced by the thionation of phenyl-para-amino-para-oxy-diphenylamine or its corresponding indophenol, either by means of aqueous or alcoholic polysulphide. As an example of such dyes may be mentioned pyrogen indigo blue 5G and immedial indogene BBF. In the past, however, the usefulness of these dyes has been limited by the fact that the products produced commercially have not been suitable for certain types of machine dyeing. This disadvantage is due to the fact that commercial preparations of these dyes have contained considerable amounts of insoluble material which renders the dye unfit for use in the machines used by the dyers. Up to the present, no manufacturing process has produced a dye satisfactory in this respect.

I have now discovered that by treating with sulphuric acid, preferably at a temperature below 90° C., the product produced by (1) thionation of the above described indophenol or leuco-indophenol in aqueous or alcoholic polysulphide, and (2) separation from the resulting solution by means of air or acid, a dye is obtained which is satisfactory for any type of dyeing. By this treatment with sulphuric acid, the insoluble impurities appear to be rendered soluble in sodium sulphide solution.

The product to which my purification process is applicable can be prepared, for example, as follows:

(*a*)—One part of indophenol or leuco indophenol prepared by the condensation of p-nitroso-phenol and diphenylamine according to U. S. P. 727,387 is refluxed with an aqueous solution of 2.5 parts of sodium sulphide crystals and 1.0 part of sulphur for about 40 hours at 115–120° C. The fusion mixture is diluted with water and the dye is precipitated with air and filtered.

The purification in accordance with my invention of the dye obtained by (*a*) above may be illustrated by the following example:

Four hundred parts of the dried dye made in the manner above-described is introduced in to 3200 parts of 93% sulphuric acid simultaneously with 520 parts of water. The temperature is allowed to rise to 80° C.–85° C. and the mixture is stirred until homogeneous, i. e. for about ten minutes. The mixture is drowned in cold water and the dye is filtered off and dried. An equivalent amount of dye paste could be used instead of the dry dye. The procedure can also be carried out by adding the dry dye to an 80% sulphuric acid at ordinary temperatures and then heating to 80° C.–85° C. The above mentioned amounts and concentration of acid as well as the temperature and duration of the reaction can be varied within wide limits.

The dye so obtained is distinguished from previously produced corresponding commercial specimens by the greater clarity of the vat when dissolved in sodium sulphide solution or in sodium sulphide solution to which a small amount of sodium hydrosulphite has been added. The vat obtained in the latter case is a bright lemon yellow solution practically free from turbidity while dyes produced without the treatment described in the patent give lemon colored to brownish vats showing varying degrees of turbidity.

In the above example, instead of adding the dried dye and water to sulphuric acid, the press cake resulting from the filtration step in (*a*) above, may be added. Thus 800 parts of press cake (containing, say, from 60 to 70 of water) is added to about 3200 parts of 95% sulphuric acid. The temperature, which rises spontaneously, is kept below 90° C., and the mass is stirred until homogeneous, then drowned in water and the dye filtered off and dried.

I claim:

1. The process of producing a blue sulphur dye suitable for machine dyeing which comprises treating the product obtainable by thionating with aqueous or alcoholic polysulphide an aryl-p-amino-p-oxy-diarylamine or its corresponding indophenol, with concentrated sulphuric acid to render impurities soluble in sodium sulphide solution, and then washing the resulting mass with water.

2. The process of producing a blue sulphur dye suitable for machine dyeing which comprises treating the product obtainable by thionating with aqueous or alcoholic polysulphide phenyl-p-amino-p-oxy-diphenylamine or its corresponding indophenol, with concentrated sulphuric acid to render impurities soluble in sodium sulphide solution and then washing the resulting mass with water.

3. The process of rendering suitable for machine dyeing the product obtainable by thionating, with aqueous or alcoholic polysulphide phenyl-p-amino-p-oxy-diphenylamine, and by precipitating the dye from the resulting mixture by means of acid or air, which comprises mixing one part of said product and from about 1 to 2 parts of water with about 8 parts of sulphuric acid of from 90 to 95% strength, while allowing the temperature of the mixture to rise to between 75 and 90° C., until a homogenous mixture is produced, and then treating the resulting mixture with water to precipitate the dye.

4. A process as set forth in claim 3 in which 4 parts of dried product and about 5 parts of water are mixed with about 32 parts of sulphuric acid of about 93% strength.

5. A process as set forth in claim 3 in which the homogeneous mixture is drowned in cold water, and the dye then filtered off.

6. The process of rendering suitable for machine dyeing the product obtainable by thionating, with aqueous or alcoholic polysulphide, phenyl-p-amino-p-oxy-diphenylamine, and treating the resulting mixture with acid or air, which comprises mixing one part of said product in the form of press cake with about 4 parts of concentrated sulphuric acid, while keeping the temperature below 90° C., until a homogeneous mixture is produced, and then treating the resulting mixture with water to precipitate the dye.

7. A blue sulphur dye suitable for machine dyeing, obtainable by treating a thionated phenyl-p-amino-p-oxy-diphenylamine with concentrated sulphuric acid and then with water to precipitate the dye, said dye yielding a vat which is a bright lemon yellow solution practically free from turbidity.

In testimony whereof I affix my signature.

WALTER A. MANSS.